United States Patent [19]
Scribner et al.

[11] Patent Number: 6,133,645
[45] Date of Patent: Oct. 17, 2000

[54] ELECTRONIC DEVICE DISCONNECT CIRCUIT

[75] Inventors: Paul Scribner, Walkerton, Ind.; Dan Semple, Maple City, Mich.

[73] Assignee: Audiovox Specialized Applications, Elkhart, Ind.

[21] Appl. No.: 09/263,294

[22] Filed: Mar. 5, 1999

[51] Int. Cl.$^7$ .................................................. H02H 7/18
[52] U.S. Cl. ............................ 307/9.1; 307/127; 361/84; 429/1
[58] Field of Search ........................... 307/9.1, 127, 10.1; 361/82, 84, 23, 7; 320/165; 429/1

[56] References Cited

U.S. PATENT DOCUMENTS

| | | | |
|---|---|---|---|
| 3,858,104 | 12/1974 | Grob | 363/23 |
| 4,209,816 | 6/1980 | Hansen | 361/23 |
| 5,359,486 | 10/1994 | Crane et al. | 361/7 |
| 5,683,827 | 11/1997 | Yu | 429/1 |

Primary Examiner—Albert W. Paladini
Attorney, Agent, or Firm—Baker & Daniels

[57] ABSTRACT

An electronic disconnect circuit protects an electronic device, such as a radio, installed in a motor vehicle from overvoltage condition in which the normal internal protection is inadequate. A normally closed relay includes 2 sets of terminals connected in the ground conductor and in the voltage conductor of the power cable connected to the electronic device. The relay coil is connected through a diode which becomes conductive if the voltage in the ground conductor rises above the voltage in the other conductor, thus protecting the radio or similar electronic device from a reversal of polarity as would occur when a battery charger or similar device is improperly connected to the vehicle. A switching transistor responds to an over voltage condition to turn on the relay coil when an over voltage condition occurs, such as during a high voltage jump start or a high voltage transient condition.

28 Claims, 3 Drawing Sheets

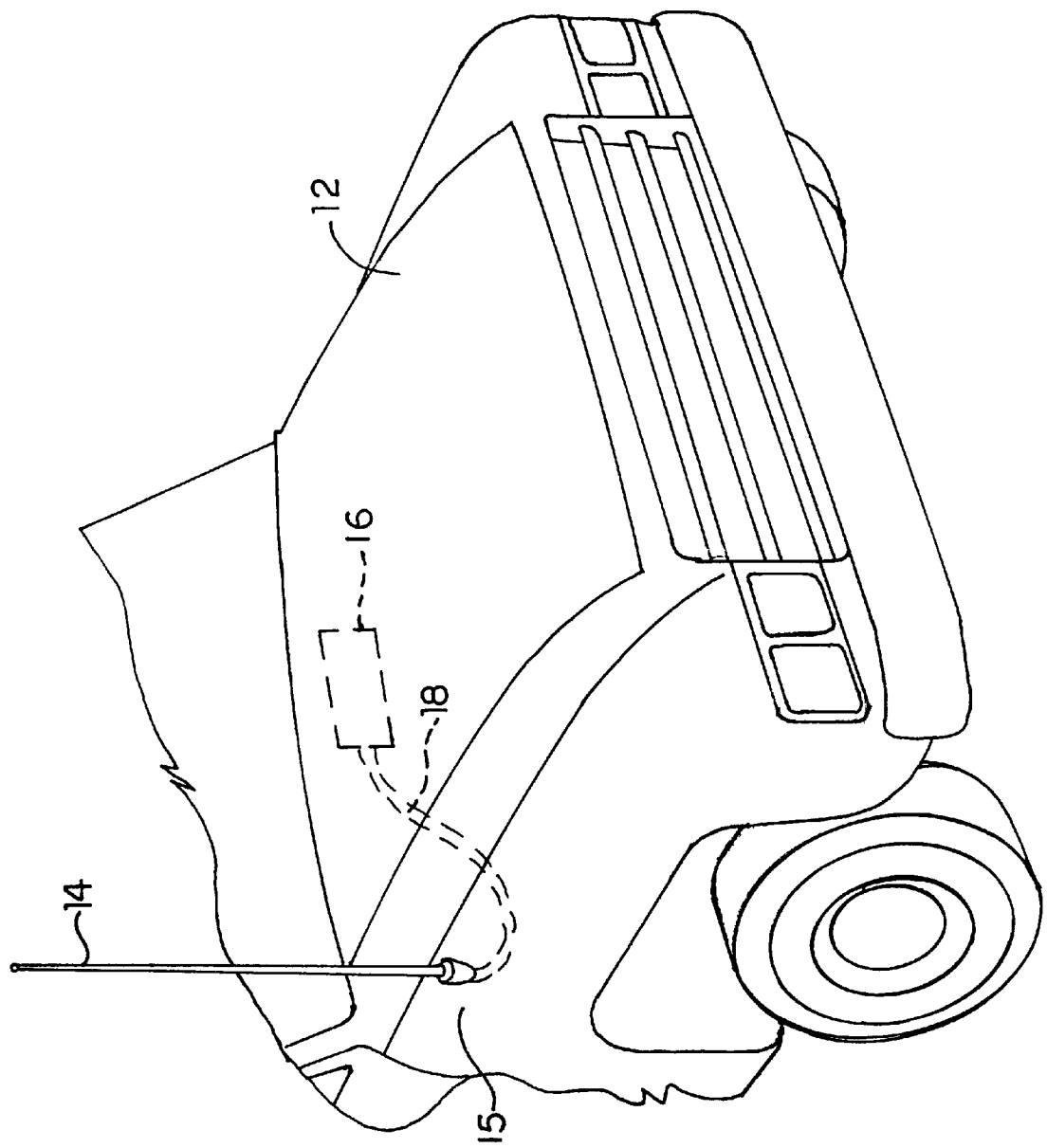

ELECTRONIC DEVICE DISCONNECT CIRCUIT

This invention relates to the protection of electronic devices used on automotive vehicles.

Electronic entertainment devices, such as radios, CD players, etc. have become increasingly common on motor vehicles. Many such devices initially designed for use on passenger cars are now commonly used on medium and heavy trucks. Electronic entertainment devices are commonly provided with internal protection devices, such as zenner diodes, which protect the device from overvoltage conditions. While such internal protection is normally all that is required for devices used on passenger cars, electronic devices may be inadequately protected if used on medium and heavy duty trucks, particularly trucks equipped with diesel engines. Such medium and heavy duty trucks and other vehicles equipped with diesel engines require far more power to crank the engine during starting than do passenger cars. Since it is common to "jump start" a vehicle having, for example, a disabled battery, and since it is also common to use battery chargers to charge batteries, it is necessary to protect electronic devices during such procedures. When jump starting medium and heavy duty trucks equipped with diesel engines, it is common to use a source of electrical energy which is far more powerful than that commonly used to jump start or charge passenger car batteries. Accordingly, the internal overvoltage protection provided on electronic entertainment devices is inadequate to protect the devices against the large currents generated by heavy duty chargers used to charge batteries in medium and heavy duty commercial vehicles.

Furthermore, inexperienced operators commonly reverse the polarity by mistakenly connecting the positive terminal to the normally grounded vehicle body and the negative terminal to the positive battery terminal when connecting the charging device to the vehicle. When this occurs, the vehicle body, which is normally grounded, is at a high voltage and damage to the electronic components is immediate and catastrophic. The internal protection does not react quickly enough and has insufficient capacity to protect the electronic components when such heavy duty chargers are used and/or the charger is connected with reversed polarity. If the vehicle body becomes charged to a high voltage due to a reversal of polarity during jump starting or charging, vehicle radios are particularly at risk, because they are connected to an antenna commonly mounted on the vehicle fender or some other exterior body part which is normally grounded through a shielded antenna cable. The high voltage due to misconnection of the charging or jump starting equipment, then is immediately conducted to the radio through the cable shield, thus immediately destroying the radio.

According to the present invention, an electric disconnect circuit is connected in the power cable which connects the radio or similar entertainment device to the vehicle power source and to the grounded vehicle body. The circuit is responsive to an overvoltage condition or to a reversal of priority to immediately disconnect the radio or similar electronic component from the power source and the grounded vehicle body, thus protecting the electronic component from damage. When the overvoltage condition or a reversal of polarity no longer exists, the radio or similar electronic component is automatically reconnected. The circuit also protects against long high voltage transients, such as those occurring when it is attempted to charge a disconnected battery.

These and other advantages of the present invention will become apparent from the following description with reference to the accompanying drawings in which:

FIG. 3 is a fragmentary view in perspective of the front portion of the vehicle illustrated in FIG. 1 illustrating the manner in which the antenna is connected to the vehicle radio.

Figure 1:
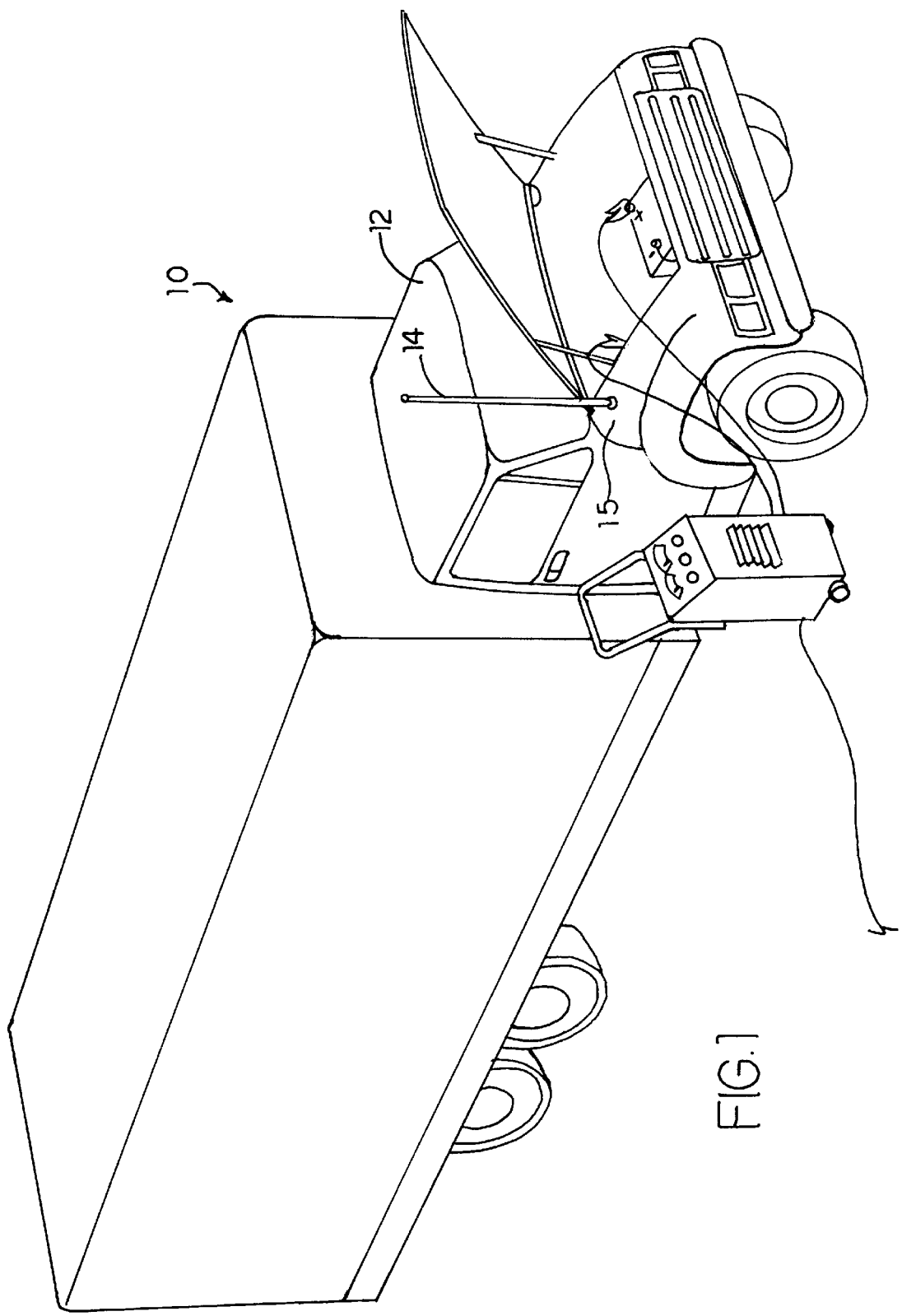
FIG. 1 is a view in perspective of a heavy duty vehicle incorporating the electronic disconnect circuit pursuant to the present invention.

Referring now to the drawings, a heavy duty vehicle, such as a medium trucks is generally indicated by the numeral 10 and includes a metal body 12 that provides an electrical ground for all of the electrical devices used on the vehicle. Antenna 14 is mounted on the front fender 15 which is a part of the grounded body 12. The antenna 14 is connected to the vehicle radio 16 by a shielded cable 18. Antenna 14 is mounted on the fender 15 through a conventional mount 20 in which the shield of the cable is connected to ground with the fender 15. The radio 16 is provided with conventional protection circuitry that is internal to the radio, such as zenner diode 22.

Power is transmitted to the radio 16 through a cable including a ground conductor 24 and a positive voltage conductor 26. A relay generally indicated by the numeral 28 includes a first set of contacts 30 connected in the conductor 26 and a second set of relay contacts 32 connected in the conductor 24. Switch arms 34, 36 are normally closed but are opened in response to energization of a relay coil 38 which is connected between the conductors 26, 24 by way of diode 40 and switching transistor 42 in parallel with one another. The base electrode of the switching transistor 42 is connected between voltage dividing resistors 44 and 46, which are connected in series between the conductors 26 and 24.

Figure 2:
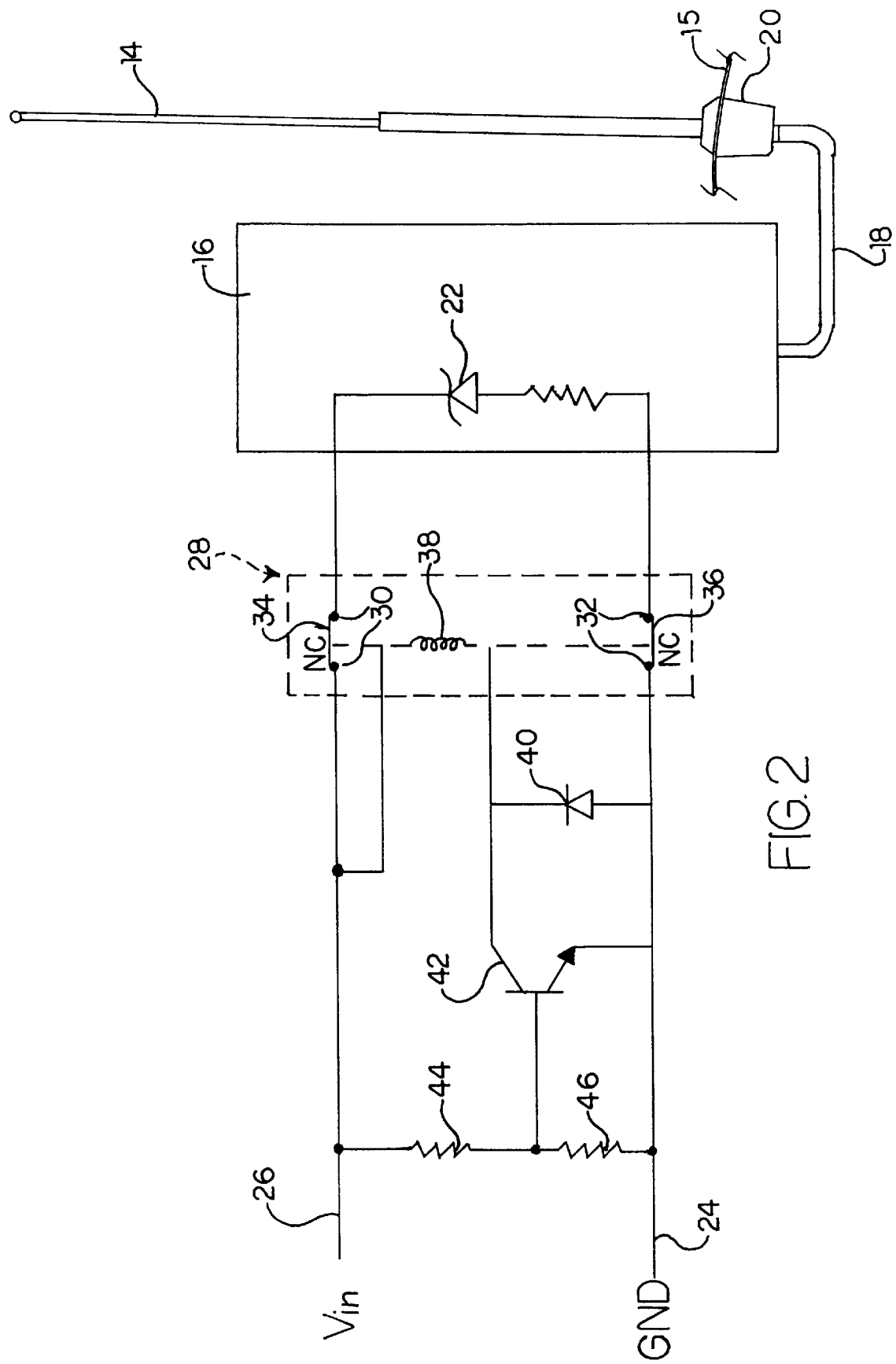
FIG. 2 is a circuit diagram of the electronic disconnect circuit of the present invention.

As discussed above, the circuit disclosed in FIG. 2 protects electronic devices such as radio 16 from a reversal polarity, as would occur as when a jump start is attempted with the grounded body connected to the positive electrode, a high voltage in the power source used, for example for a jump starting vehicle and long transients, such as would occur when it is attempted to charge a disconnected battery by the vehicle alternator. In the high voltage conditions, the transistor 42 is turned on whenever the voltage in the conductor 26 increases to a predetermined level established by the values of resistors 44 and 46 to thereby turn on transistor 42. Accordingly, coil 38 is then energized, thereby opening the switch arms 34, 36 and disconnecting the radio 16 from both of the conductors 24 and 26. When a reversal of polarity occurs, diode 40 become conductive, thereby providing a path between the conductors 24 and 26 through the relay coil 38 and diode 40. Accordingly, switch arms 34, 36 are opened by energization of the relay coil 38, thus disconnecting the electronic device or radio 16 from the vehicle if the voltage of ground line 24 exceeds the voltage on conductor 26. By opening the ground conductor 24, the radio 16 is protected from damage due to the shield of the cable 18 conducting from a positive charged vehicle body. Accordingly, by disconnecting both of the conductors 24 and 26 from the electronic device 16, the device 16 is protected from voltage conditions in which the normal protection within the device is inadequate.

What is claimed is:

1. In a vehicle having an electrical system including an electrically conductive body normally providing a ground signal and a source of electrical energy normally providing a positive voltage signal and electronic equipment a circuit connecting said electronic equipment to both said energy source and to said vehicle body, said circuit including an electronic disconnect component responsive to a reversal of polarity of the vehicle electrical system in which the vehicle body becomes positively charged relative to said positive voltage signal for disconnecting the electronic equipment from both said energy source and said vehicle body.

2. Circuit as claimed in claim 1, wherein said circuit includes a first circuit path connecting said electronic equipment with said positive voltage signal and a second circuit path connecting said electronic equipment with said ground signal, said electronic disconnect component including a pair of electrically operated switches, one of said switches being located in each of said circuit paths.

3. Circuit as claimed in claim 2, wherein said electronic disconnect component includes means for sensing said reversal of polarity and simultaneously actuating said switches in response thereto.

4. Circuit as claimed in claim 1, wherein said circuit includes a first circuit path connecting said electronic equipment with said positive voltage signal and a second circuit path connecting said electronic equipment with said ground signal, said electronic disconnect component including a relay having a first set of contacts connected in said first circuit path, a second set of contacts connected in said second circuit path, a relay coil for simultaneously opening said contacts, and polarity sensing means for sensing said reversal of polarity and energizing said relay coil to simultaneously open both sets of contacts when said reversal of polarity is sensed.

5. Circuit as claimed in claim 4, wherein said polarity sensing means includes a diode connected in series with said relay coil between said circuit paths.

6. Circuit as claimed in claim 4, wherein said electronic disconnect component includes a switch responsive to a high voltage transient condition in said first circuit path to energize said coil in response thereto whereby said coil simultaneously opens both sets of contacts.

7. Circuit as claimed in claim 1, wherein said electronic disconnect component includes means responsive to a high voltage transient condition in the vehicle electrical system for disconnecting said electronic equipment from said energy source.

8. In a vehicle having an electrical system including an electrically conductive body normally providing a ground signal, a source of electrical energy normally providing a positive voltage signal, and electronic equipment, a circuit connecting said electronic equipment to both said energy source and to said vehicle body, said circuit including an electronic disconnect component responsive to a reversal of polarity of the vehicle electrical system in which the vehicle body becomes positively charged relative to said positive voltage signal and to an overvoltage condition in said vehicle electrical system for disconnecting the electronic equipment from both said energy source and said vehicle body.

9. Circuit as claimed in claim 8, wherein said circuit includes a first circuit path connecting said electronic equipment with said positive voltage signal and a second circuit path connecting said electronic equipment with said ground signal, said electronic disconnect component including a relay having a first set of contacts connected in said first circuit path, a second set of contacts connected in said second circuit path, a relay coil for simultaneously opening said contacts, overvoltage sensing means for sensing said overvoltage condition in said vehicle electrical system for energizing said relay coil when said overvoltage condition is sensed to simultaneously open both sets of contacts, and polarity sensing means for sensing said reversal of polarity and energizing said relay coil to simultaneously open both sets of contacts when said reversal of polarity is sensed.

10. Circuit as claimed in claim 9, wherein said polarity sensing means includes a diode connected in series with said relay coil between said circuit paths.

11. Circuit as claimed in claim 9, wherein said electronic disconnect component includes a switch responsive to said overvoltage condition in said first circuit path to energize said coil in response thereto whereby said coil simultaneously opens both sets of contacts.

12. Circuit as claimed in claim 8, wherein said circuit includes a first circuit path connecting said electronic equipment with said positive voltage signal and a second circuit path connecting said electronic equipment with said ground signal, said electronic disconnect component including a pair of electrically operated switches, one of said switches being located in each of said circuit paths.

13. Circuit as claimed in claim 12, wherein said electronic disconnect component includes means for sensing said reversal of polarity and simultaneously actuating said switches in response thereto.

14. Circuit as claimed in claim 12, wherein said electronic disconnect component includes means for sensing said overvoltage condition and simultaneously actuating said switches in response thereto.

15. In an automotive vehicle having an electrically conductive body normally providing an electrical ground and also having electronic equipment connected to a source of electrical energy carried by the vehicle and to said grounded body, said vehicle including an electric circuit connecting said electronic equipment to both said energy source and to said vehicle body, said electric circuit including an electronic disconnect component responsive to an overvoltage condition in said electric circuit for disconnecting the electronic equipment from both said energy source and said vehicle body, said circuit including a first circuit path connecting said electronic equipment with said energy source and a second circuit path connecting said electronic equipment with an electrical ground through said grounded body, said electronic disconnect component including a relay having a first set of contacts connected in said first circuit path, a second set of contacts connected in said second circuit path, a relay coil for simultaneously opening said contacts, and overvoltage sensing means for sensing said overvoltage condition in said electric circuit for energizing said relay coil when said overvoltage condition is sensed to simultaneously open both sets of contacts.

16. In a vehicle having an electrical system including an electrically conductive body normally providing a ground signal and a source of electrical energy normally providing a positive voltage signal and electronic equipment, a circuit connecting said electronic equipment to both said energy source and to said vehicle body, said circuit including an electronic disconnect component responsive to a reversal of polarity of the vehicle electrical system in which the vehicle body becomes positively charged relative to said positive voltage signal for disconnecting the electronic circuit from both said energy source and said vehicle body, wherein said circuit includes a first circuit path connecting said electronic equipment with said positive voltage signal and a second circuit path connecting said electronic equipment with said ground signal, said electronic disconnect component including a pair of electrically operated switches, one of said switches being located in each of said circuit paths.

17. Circuit as claimed in claim 16, wherein said electronic disconnect component includes means for sensing said reversal of polarity and simultaneously actuating said switches in response thereto.

18. In a vehicle having an electrical system including an electrically conductive body normally providing a ground signal and a source of electrical energy normally providing a positive voltage signal and electronic equipment, a circuit connecting said electronic equipment to both said energy source and to said vehicle body, said circuit including an electronic disconnect component responsive to a reversal of polarity of the vehicle electrical system in which the vehicle body becomes positively charged relative to said positive voltage signal for disconnecting the electronic circuit from both said energy source and said vehicle body, wherein said circuit includes a first circuit path connecting said electronic equipment with said positive voltage signal and a second circuit path connecting said electronic equipment with said ground signal, said electronic disconnect component including a relay having a first set of contacts connected in said first circuit path, a second set of contacts connected in said second circuit path, a relay coil for simultaneously opening said contacts, and polarity sensing means for sensing said reversal of polarity and energizing said relay coil to simultaneously open both sets of contacts when said reversal of polarity is sensed.

19. Circuit as claimed in claim 18, wherein said polarity sensing means includes a diode connected in series with said relay coil between said circuit paths.

20. Circuit as claimed in claim 18, wherein said electronic disconnect component includes a switch responsive to a high voltage transient condition in said first circuit path to energize said coil in response thereto whereby said coil simultaneously opens both sets of contacts.

21. In a vehicle having an electrical system including an electrically conductive body normally providing a ground signal and a source of electrical energy normally providing a positive voltage signal and electronic equipment, a circuit connecting said electronic equipment to both said energy source and to said vehicle body, said circuit including an electronic disconnect component responsive to a reversal of polarity of the vehicle electrical system in which the vehicle body becomes positively charged relative to said positive voltage signal for disconnecting the electronic circuit from both said energy source and said vehicle body, wherein said electronic disconnect component includes means responsive to a high voltage transient condition in the vehicle electrical system for disconnecting said electronic equipment from said energy source.

22. In a vehicle having an electrical system including an electrically conductive body normally providing a ground signal, a source of electrical energy normally providing a positive voltage signal and electronic equipment, a circuit connecting said electronic equipment to both said energy source and to said vehicle body, said circuit including an electronic disconnect component responsive to a reversal of polarity of the vehicle electrical system in which the vehicle body becomes positively charged relative to said positive voltage signal and to an overvoltage condition in said vehicle electrical system for disconnecting the electronic equipment from both said energy source and said vehicle body, wherein said circuit includes a first circuit path connecting said electronic equipment with said positive voltage signal and a second circuit path connecting said electronic equipment with said ground signal, said electronic disconnect component including a relay having a first set of contacts connected in said first circuit path, a second set of contacts connected in said second circuit path, a relay coil for simultaneously opening said contacts, overvoltage sensing means for sensing said overvoltage condition in said vehicle electrical system for energizing said relay coil when said overvoltage condition is sensed to simultaneously open both sets of contacts, and polarity sensing means for sensing said reversal of polarity and energizing said relay coil to simultaneously open both sets of contacts when said reversal of polarity is sensed.

23. Circuit as claimed in claim 22, wherein said polarity sensing means includes a diode connected in series with said relay coil between said circuit paths.

24. Circuit as claimed in claim 22, wherein said electronic disconnect component includes a switch responsive to said overvoltage condition in said first circuit path to energize said coil in response thereto whereby said coil simultaneously opens both sets of contacts.

25. In a vehicle having an electrical system including an electrically conductive body normally providing a ground signal, a source of electrical energy normally providing a positive voltage signal and electronic equipment, a circuit connecting said electronic equipment to both said energy source and to said vehicle body, said circuit including an electronic disconnect component responsive to a reversal of polarity of the vehicle electrical system in which the vehicle body becomes positively charged relative to said positive voltage signal and to an overvoltage condition in said vehicle electrical system for disconnecting the electronic equipment from both said energy source and said vehicle body, wherein said circuit includes a first circuit path connecting said electronic equipment with said positive voltage signal and a second circuit path connecting said electronic equipment with said ground signal, said electronic disconnect component including a pair of electrically operated switches, one of said switches being located in each of said circuit paths.

26. Circuit as claimed in claim 25, wherein said electronic disconnect component includes means for sensing said reversal of polarity and simultaneously actuating said switches in response thereto.

27. Circuit as claimed in claim 25, wherein said electronic disconnect component includes means for sensing said overvoltage condition and simultaneously actuating said switches in response thereto.

28. An electronic disconnect circuit for use on a vehicle having electronic equipment normally receiving a positive voltage from a power source carried by the vehicle and a ground signal from a connection to the vehicle body the circuit connecting the electronic equipment to both the positive voltage and the ground signal and including an electronic disconnect component which is capable of responding to either a reversal of polarity, wherein the ground signal voltage exceeds the positive voltage, or an overvoltage condition, wherein the positive voltage exceeds a predetermined value, by disconnecting the electronic equipment from both the positive voltage and the ground signal.

\* \* \* \* \*